UNITED STATES PATENT OFFICE.

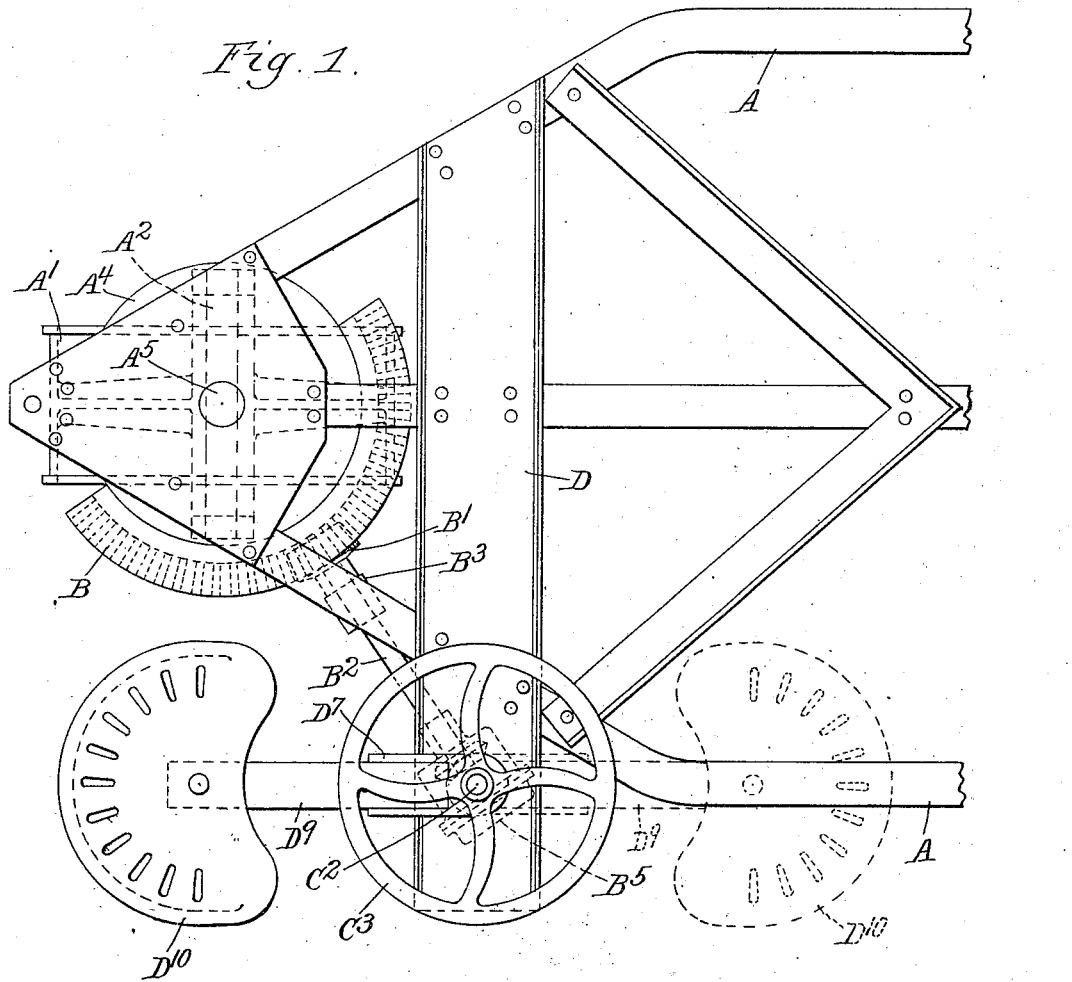

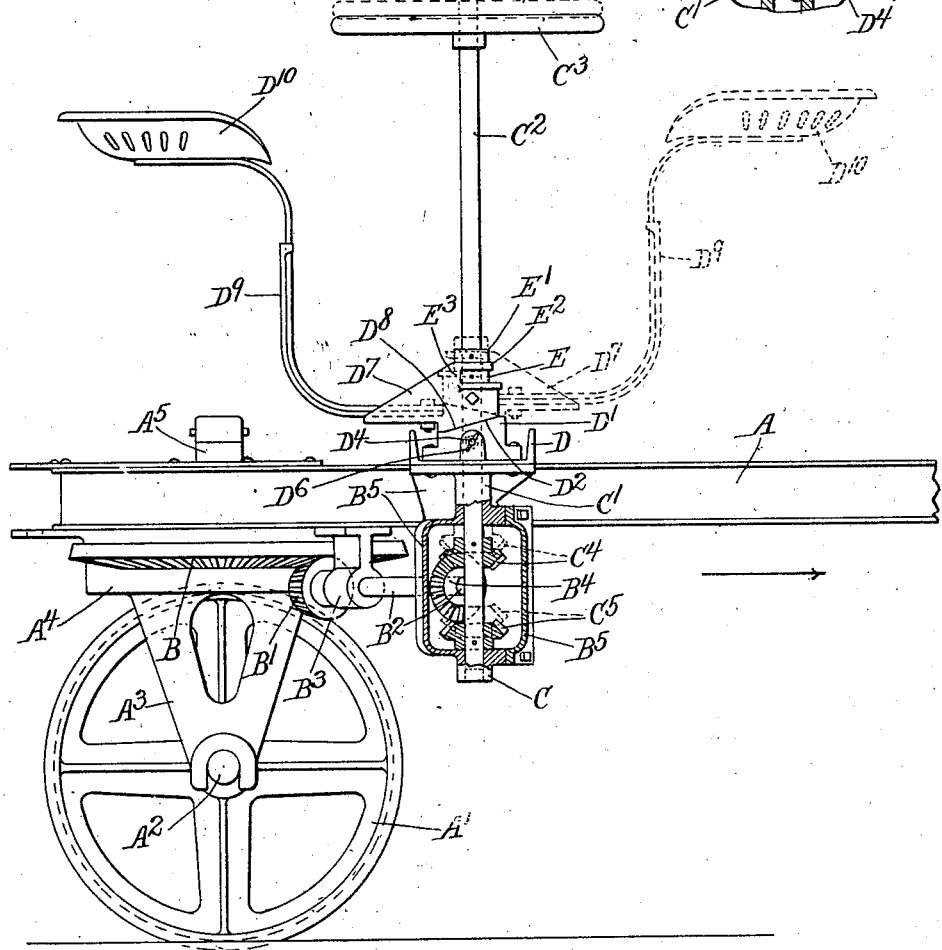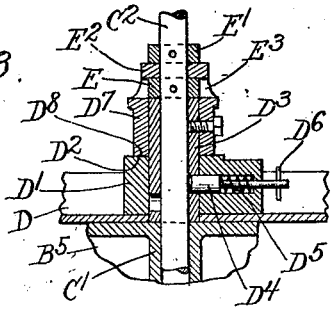

ALBERT F. MOHR, OF LAPORTE, INDIANA, ASSIGNOR, BY MESNE ASSIGNMENTS, TO ADVANCE-RUMELY COMPANY, OF LAPORTE, INDIANA, A CORPORATION OF INDIANA.

STEERING-GEAR FOR MOTOR-VEHICLES.

1,189,378.  Specification of Letters Patent.  Patented July 4, 1916.

Application filed June 21, 1915. Serial No. 35,207.

*To all whom it may concern:*

Be it known that I, ALBERT F. MOHR, a citizen of the United States, residing at Laporte, in the county of Laporte and State of Indiana, have invented a certain new and useful Improvement in Steering-Gear for Motor-Vehicles, of which the following is a specification.

My invention relates to improvements in steering gears for motor vehicles and has for one object to provide a steering gear which may be used in connection with a reversible motor vehicle to facilitate the operation thereof.

Another purpose of my invention is to automatically reverse the relation between the rotating ground wheel and the control wheel in response to the movement of the steering seat.

Other objects of my invention will appear from time to time in the specification.

The invention is illustrated more or less diagrammatically in the accompanying drawings, wherein—

Figure 1 is a plan view of the steering end of a traction engine embodying my invention; Fig. 2 is a side elevation of a part of the machine shown in Fig. 1; Fig. 3 is a detail section through the seat locking device.

Like parts are indicated by like letters throughout the several figures.

A is a tractor or motor vehicle frame. It is supported in this case by a single steering wheel $A^1$ provided with an axle $A^2$ rotatable in supporting yokes $A^3$. These yokes project downwardly from a turn-table $A^4$ pivoted on the frame by means of the pin $A^5$. The turn-table $A^4$ is provided with a segmental miter gear B. In mesh with this gear is a miter pinion $B^1$. This pinion is mounted on a shaft $B^2$ supported by a bracket $B^3$. The inner end of the shaft $B^2$ carries a miter pinion $B^4$ located within a housing $B^5$.

Slidably and rotatably mounted in bearings C, $C^1$ and contained partially within and partially projecting above the steering wheel is a steering column $C^2$ provided with a control $C^3$ at the upper end thereof. This column has at its lower end within the housing $B^5$ two miter gears $C^4$, $C^5$ one of them adapted to be in mesh with the miter gear $B^4$ when the other is out of mesh. In the arrangement shown in full lines the machine is to be steered in the direction of the arrow. In this case the pinion $B^4$ will be in mesh with the pinion $C^4$.

The housing bracket $B^6$ is suspended from a channel D which channel extends across the frame A. On this channel is rigidly mounted a collar $D^1$ having an inclined cam surface $D^2$ on the top thereof. Rotatably mounted within this collar is a sleeve $D^3$ locked against rotation by means of the locking pin $D^4$ held yieldingly in the locking position by means of the spring $D^5$ and provided with a handle $D^6$ whereby it may be withdrawn. The sleeve $D^3$ carries a bracket $D^7$ having a bearing surface $D^8$ in engagement with the cam surface $D^2$ so that upon a rotation of the sleeve this bracket bearing surface will ride up along the cam surface and raise the sleeve.

$D^9$ is a spring seat support projecting from and mounted on the bracket $D^7$ and carrying the driving seat $D^{10}$.

E, $E^1$ are collars rigidly mounted on the steering column $C^2$. The collar E rests on the upper end of the sleeve $D^3$ and is spaced from the collar $E^1$ by a collar $E^2$ mounted on a yoke $E^3$ carried by the bracket $D^7$ so that the steering column is held firmly against longitudinal movement with respect to the sleeve.

It will be evident that while I have shown in my drawings an operative device, still many changes might be made both in size, shape and arrangement of parts without departing from the spirit of my invention, and I wish, therefore, that my drawings be regarded as in a sense diagrammatic.

The use and operation of my invention are as follows:—With the machine parts in the position shown in full lines the tractor is intended to move forwardly in the direction shown by the arrow and a rotation of the steering wheel will cause the vehicle to steer in the same manner that the usual road vehicle or motor vehicle is steered. When it is desired to reverse it, however, and drive the vehicle in the opposite direction, the spring held locking pin will be withdrawn and the operator will swing the seat through an angle of 180° into the position shown in dotted lines allowing the spring pin to drop back into the locking position. This rotation of the seat will swing it around into the desired position in the reverse movement so that the operator may still face forward, but the reverse movement would make the steering movement of the wheel operate in the opposite direction and so to prevent this the steering column is connected up to the seat so that when the seat is reversed the steering column is by the cam arrangement raised to bring the other miter gear into mesh to equalize the steering movement. The result is that the machine steers well in either direction without inconvenience to the operator. Thus a movement of the seat in this case a rotation about its pivot point in a horizontal plane results in reversing the connection between the control member, viz., the hand wheel and the steering wheel, viz: the ground contacting and steering wheel. The result is that no matter which way the operator sits so that as he faces forward and his seat adjusted for such forward movement a turn of the steering wheel to the right results in a turn of the vehicle to the right and vice versa.

I claim:

1. The combination with a motor vehicle of a single steering column, a hand wheel thereon, a connection from the column to the running gear, and a seat free to move so as to face in opposite direction, means responsive to such movement of the seat for reversing the connection between the steering column and the running gear.

2. The combination with a motor vehicle of a single steering column, a hand wheel thereon, a connection from the column to the running gear, and a seat free to move so as to face in opposite direction, means responsive to such movement of the seat for reversing the connection between the steering column and the running gear, said means comprising connecting gears adapted for operation in two directions, and a cam responsive to the rotation of the movement of the steering column to throw said gears selectively into operation.

3. The combination with a motor vehicle of a steering wheel, a control member therefor and a connection between them comprising a longitudinally movable steering column, a pair of miter pinions rigid thereon, a miter gear interposed between them, a connection between the miter gear and the steering wheel and means controlled by the operator for longitudinally moving the steering column to bring one of said miter gears selectively into engagement with the miter pinion.

4. The combination with a motor vehicle of a steering wheel, a control member therefor and a connection between them comprising a longitudinally movable steering column, a pair of miter pinions rigid thereon, a miter gear interposed between them, a connection between the miter gear and the steering wheel and means controlled by the operator for longitudinally moving the steering column to bring one of said miter gears selectively into engagement with the miter pinion to reverse the connection between the control member and the steering wheel.

5. The combination with a motor vehicle of a steering wheel, a control member therefor and a connection between them comprising a longitudinally movable steering column, a pair of miter pinions rigid thereon, a miter gear interposed between them, a connection between the miter gear and the steering wheel and means comprising a movable seat and operating mechanism actuated by the movement thereof for longitudinally moving the steering column to bring one of said miter gears selectively into engagement with the miter pinion.

6. The combination with a motor vehicle of a steering wheel, a control member therefor and a connection between them comprising a longitudinally movable steering column, a pair of miter pinions rigid thereon, a miter gear interposed between them, a connection between the miter gear and the steering wheel and means comprising a movable seat and operating mechanism actuated by the movement thereof for longitudinally moving the steering column to bring one of said miter gears selectively into engagement with the miter pinion, said seat control means comprising a fixed sleeve, a cam carried thereby, a sleeve held against longitudinal movement with respect to the steering column having a bearing surface resting upon said cam and a bracket on said sleeve supporting said seat together with locking mean for holding said sleeve in position.

In testimony whereof, I affix my signature in the presence of two witnesses this 12th day of June 1915.

ALBERT F. MOHR.

Witnesses:
 JNO. GESSNER,
 B. J. LEPSCHULZ.